United States Patent [19]
Puttner et al.

[11] 3,907,861
[45] Sept. 23, 1975

[54] CYANOPHENOXYACETONITRILES

[75] Inventors: Reinhold Puttner; Friedrich Arndt, both of Berlin, Germany

[73] Assignee: Schering Aktiengesellschaft, Berlin, Germany

[22] Filed: June 26, 1973

[21] Appl. No.: 373,864

[30] Foreign Application Priority Data
July 13, 1972   Germany............................ 2234817

[52] U.S. Cl...................... 260/465 F; 71/92; 71/93; 71/94; 71/105
[51] Int. Cl.$^2$....................................... C07C 121/75
[58] Field of Search.................... 260/465 F; 71/105

[56] References Cited
UNITED STATES PATENTS

| | | | |
|---|---|---|---|
| 3,449,357 | 6/1969 | White | 260/465 X |
| 3,467,692 | 9/1969 | Newallis et al. | 260/465 |
| 3,535,365 | 10/1970 | Weinstock et al. | 260/465 |

Primary Examiner—Lewis Gotts
Assistant Examiner—Dolph H. Torrence
Attorney, Agent, or Firm—Joseph F. Padlon

[57]   ABSTRACT

The preparation of cyanophenoxyacetonitriles including the uses thereof in herbicidal compositions.

8 Claims, No Drawings

CYANOPHENOXYACETONITRILES

The invention relates to new 4-cyanophenoxyacetonitriles, to methods for their production, as well as to herbicidal compositions containing these compounds as active ingredients.

Halogen-substituted benzonitriles having a herbicidal effect are known, for example 3,5-diiodo-4-hydroxybenzonitrile as disclosed in German Pat. No. 1,266,563. This compound and its derivatives are used particularly for weed control in cereal crops but have insufficient selectivity for use in other important crops.

It is an important object of this invention to provide chemically similar herbicides which selectively combat weeds in crops other than cereals.

It has now been found that compounds of the formula

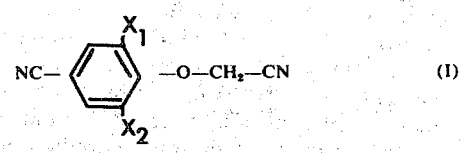

in which $X_1$ and $X_2$ represent halogen, have a herbicidal effect and can be used for combating weeds among carrots, seed sorghum, peas, alfalfa and peanuts without damage to the crop plants.

The halogen substituents $X_1$ and $X_2$ in the phenyl radical of the above formula are iodine, bromine and chlorine and are preferably identical.

The compounds of the invention are effective herbicidal agents against numerous weed species as, for example, *Stellaria media, Senecio vulgaris, Matricaria chammomilla, Lamium amplexicaule, Centaurea, cyanus, Amaranthus retroflexus, Galium aparine, Chrysanthemum segetum, Ipomea purpurea, Polygonum lapathiofolium, Sinapis ssp* and *Salanum ssp*. The herbicidal compositions of the invention are applied to the weeds after emergence at rates varying from about 1 to 5 kg of active agent per hectare, depending on the weed species and other variables.

It has further been found that mixtures of the compounds according to the invention with other herbicides frequently show a synergistic effect. Suitable partners of herbicidal effect may be named. For example: Carboxylic acids and their derivatives, such as 2,3,6-trichlorobenzoic acid and its salts; 2-methoxy-3,6-dichlorobenzoic acid and its salts; 2,4-dichlorphenoxyacetic acid and its salts and esters; 2-methyl-4-chlorphenyl-alpha-propionic acid, its salts and esters, 2,2-dichloropropionic acid and its salts and esters; carbaminic acid derivatives, such as methyl-N-(3,4-dichlorophenyl)-carbamate, phenols, such as dinitro-0-(sec.-butyl)-phenol and its salts; substituted ureas, such as 1-(3'-(N-methyl-N-phenyl-carbamoyloxy)-phenyl)-3,3-dimethyl urea; substituted triazines, such as 2-chloro-4-ethylamino-6-isopropylamino-S-triazine; diphenyl ether derivatives, such as 2,4-dichloro-4'-nitrophenyl ether; anilides, such as N-(4-chlorophenyl)-alpha, alpha dimethylvalerianic acid amide; uracils, such as 3-cyclohexyl-4,5-trimethylene uracil; nitriles, such as 2,6-dichlorobenzonitrile, as well as organic herbicides containing maleic hydrazide, 3-amino-1,2,4-triazole, N-(1,1-dimethyl-2-propyl)-3,5-dichlorobenzamide, N,N-di-(n-propyl)-2,6-dinitro-4-trifluormethyl aniline, 4-amino-3,5,6-trichloropicolinic acid and 1,1'-dimethyl-4,4'-bipyridinium salts.

Depending on the purpose for which used, other substances may be added, by which it must be understood that non-phytotoxic additions such as wetting agents, emulsifiers, solvents, oily additions and others give a synergistic potentiation with herbicides.

The active substances according to the invention or their mixtures are advantageously used in the form of preparations, as powders, scatters, granulations, solutions, emulsions or suspensions, with the addition of liquid and/or solid vehicles or diluents and possibly wetting, adhesive, emulsifying and/or dispersing aids.

Suitable liquid vehicles that may be used are water, and aliphatic and aromatic hydrocarbons, such as benzene, toluene, cyclohexanone, isophorone, also mineral oil fractions.

Suitable solid vehicles that are used are mineral earths such as siliceous clay, silica gel, talc, kaolin, attaclay, limestone, silica, and plant products, such as flours.

Among surface-active substances which may be named are: calcium-lignin sulfonate, polyoxyethylene-octylphenol ether, naphthalene-sulfonic acids, phenolsulfonic acids, formaldehyde condensates, fat alcohol sulfates and fatty acid alkali and alkaline earth salts.

The proportion of active substance or substances used in the various preparations may vary within wide limits. For example, the agents contain about 20 to 80 percent by weight of active substances, about 80 to 20 percent by weight of liquid or solid vehicles as well as possibly up to 20 percent by weight of surface-active substances.

The agents may be applied in the usual manner, such as: with water as the vehicle in spray solution quantities of 100 to 1000 liters per hectare. For total weed control also the partly common quantities of more than 1000 liters per hectare can readily be applied. Also the use of the agents in the so-called "ultra-low volume process" is feasible. Likewise the mode of use in microgranulate form is feasible.

The compounds according to the invention may be produced, for example, by reacting compounds of the general formula

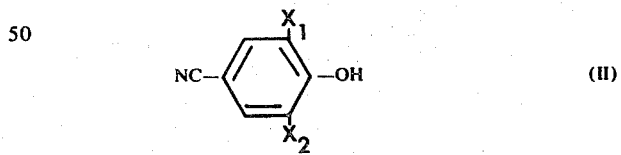

or their alkali salts, e.g. the potassium or sodium salt, with a compound of the general formula $$\text{Hal} - \text{CH}_2 - \text{CN} \qquad \text{(III)}$$

using an organic solvent, such as acetone or dimethyl sulfoxide, in the presence of an acid acceptor, such as potassium carbonate or sodium carbonate, whereas in the general formula $X_1$ and $X_2$ have the above mentioned meaning and Hal is a halogen atom.

The following examples will illustrate the production of the compounds according to the invention.

1. (2,6-diiodo-4-cyanophenoxy)-acetonitrile

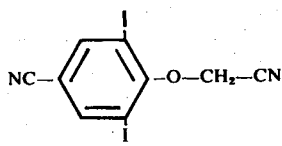

A mixture of 37.1 g (0.1 mole) 2,6-diiodo-4-cyanophenol, 9.82 g (0.13 mole) chlor acetonitrile, 13.82 g (0.1 mole) potassium carbonate and 150 ml dimethyl sulfoxide is stirred for 12 hours at 80°C. The reaction mixture is poured into iced water and extracted with chloroform. One dries with magnesium sulfate and evaporates under vacuum to dryness. The crude product is treated with isopropyl ether. The end product is then recrystallized from methanol.

Yield: 25.7 g = 63% of the theory
M.P.: 153°–154° C 2. (2,6-dibromo-4-cyanophenoxy)-acetonitrile

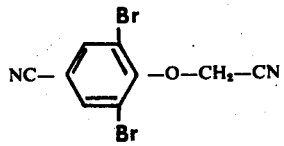

A mixture of 13.85 g (0.05 mole) 2,6-dibromo-4-cyanophenol, 15.2 g (0.2 mole) chloracetonitrile, 7.9 g (0.056 mole) potassium carbonate and 100 ml acetone is boiled with reflux for 12 hours while stirring. Then one filters and the filtrate is evaporated under vacuum to dryness. The residue is recrystallized from methanol.

Yield: 12.1 g = 77% of the theory
M.P.: 126°–129° C 3. (2,6-dichloro-4-cyanophenoxy)-acetonitrile

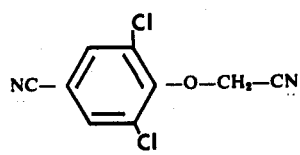

A mixture of 5.2 g (0.028 mole) 2,6-dichloro-4-cyanophenol, 11.4 g (0.15 mole) chloroacetonitrile, 4.6 g (0.033 mole) potassium carbonate and 50 ml acetone is boiled with reflux for 16 hours while stirring. Then one filters and the filtrate is concentrated to dryness under vacuum. The residue is recrystallized from methanol.

Yield: 3.6 g = 58% of the theory
M.P.: 111°–112° C

Additional compounds according to the invention are listed in the following table:

| | Compound according to invention | Physical constant |
|---|---|---|
| 4. | 2-Chloro-6-iodo-4-cyanophenoxy acetonitrile | M.P.: 137–138° C |
| 5. | 2-Chloro-6-bromo-4-cyanophenoxy acetonitrile | M.P.: 115–116° C |
| 6. | 2-Bromo-6-iodo-4-cyanophenoxy acetonitrile | M.P.: 119–121° C |

The compounds according to the invention are practically colorless and odorless crystalline substances. They are insoluble in water and gasoline and more or less soluble in acetone, tetrahydrofurane, cyclohexanone, isophorone and dimethylformamide.

The starting products for the production of the compounds according to the invention are known in the art or can be produced by methods known in the art.

The production of the preparations of the compounds according to the invention and their mixtures, ready for use, can be carried out in a well known manner, such as, by mixing or grinding. If desired, the individual components may be mixed only just before their use, as is done in the so-called tank mix process.

The following example illustrates the herbicidal effect of the compounds according to the invention.

EXAMPLE

The plant species listed in the table herewith were treated in post-emergence stage with the agents to be used according to the invention in a dose of 1 kg of active substance per hectare. The agents were sprayed uniformly as an aqueous suspension at 500 liters per hectare. Two weeks after the treatment, the degree of damage of the plants was ascertained and rated according to the evaluation code 0 - 10; with 0 = "totally destroyed" and 10 = "not damaged".

The findings show, compared with the known herbicides, the same or even a better herbicidal effect of the compounds according to the invention with greater tolerance for the crop plants.

| Compounds according to invention | a | b | c | d | e | f | g | h | i | j | k | l | m | n | o | p | q | r |
|---|---|---|---|---|---|---|---|---|---|---|---|---|---|---|---|---|---|---|
| 2,6-dibromo-4-cyano-phenoxy acetonitrile | 10 | 10 | 10 | 10 | — | 10 | 10 | 10 | 10 | 10 | 0 | 0 | 0 | 0 | 0 | 0 | 0 | 0 |
| 2,6-diiodo-4-cyano-phenoxy acetonitrile | 10 | 10 | 10 | 10 | 10 | 10 | — | 10 | 10 | 0 | 0 | 0 | 0 | 1 | 0 | 0 | 0 | 0 |
| 2,6-dichloro-4-cyano-phenoxy acetonitrile | 10 | 10 | 10 | 10 | 10 | 10 | 10 | 10 | 10 | 0 | 0 | 0 | 0 | 0 | 0 | 0 | 0 | 0 |
| 2-chloro-6-iodo-4-cyano-phenoxy acetonitrile | 10 | 10 | 10 | 10 | — | 10 | — | 10 | 10 | 1 | 0 | 0 | 0 | 0 | 1 | — | 0 | 0 |
| 2-chloro-6-iodo-4-cyano-phenoxy-acetonitrile | 10 | 10 | 10 | 10 | 10 | 10 | — | 10 | 10 | 2 | 0 | 0 | 5 | 0 | 0 | 0 | 0 | 0 |
| 2-bromo-6-iodo-4-cyano-phenoxy acetonitrile | 10 | 10 | 10 | 10 | 10 | 10 | — | 10 | 10 | 0 | 0 | 1 | 0 | 0 | 0 | — | 1 | 0 |
| Comparison agent 3,5-dibromo-4-hydroxy-benzonitrile | 10 | 10 | 10 | 10 | 5 | 0 | — | — | 8 | 2 | 0 | 0 | 0 | 0 | 0 | 0 | 0 | 0 |
| 3,5-diiodo-4-hydroxy-benzonitrile | 10 | 10 | 10 | 10 | 8 | 2 | 3 | 7 | — | 0 | 0 | 1 | 0 | 0 | 0 | 0 | 0 | 0 |

-Continued

| Compounds according to invention | a | b | c | d | e | f | g | h | i | j | k | l | m | n | o | p | q | r |
|---|---|---|---|---|---|---|---|---|---|---|---|---|---|---|---|---|---|---|
| Untreated control<br>0 = totally destroyed<br>10 = not damaged | 10 | 10 | 10 | 10 | 10 | 10 | 10 | 10 | 10 | 10 | 10 | 10 | 10 | 10 | 10 | 10 | 10 | 10 | a = Oat
b = Rye
c = Barley
d = Wheat
e = Pea
f = Carrot
g = Alfalfa
h = Peanut
i = Seed sorghum
j = *Stellaria media*
k = *Senecio vulgaris*
l = *Matricaria chamomilla*
m = *Lamium amplexicaule*
n = *Centaurea cyanus*
o = *Amaranthus retroflexus*
p = *Chrysanthemum segetum*
q = *Solanum ssp.*
r = *Sinapis ssp.*

We claim:

1. Herbicidal compounds of the general formula

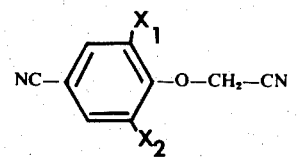

(I)

in which $X_1$ and $X_2$ are identical or different and represent halogen.

2. Compounds according to claim 1, where $X_1$ and $X_2$ represent an element selected from the group consisting of iodine, bromine and chlorine atom.

3. A compound of the formula as set forth in claim 1 which is 2,6-diiodo-4-cyanophenoxy acetonitrile.

4. A compound of the formula as set forth in claim 1 which is 2,6-dibromo-4-cyanophenoxy acetonitrile.

5. A compound of the formula as set forth in claim 1 which is 2,6-dichloro-4-cyanophenoxy acetonitrile.

6. A compound of the formula as set forth in claim 1 which is 2-chloro-6-iodo-4-cyanophenoxy acetonitrile.

7. A compound of the formula as set forth in claim 1 which is 2-chloro-6-bromo-4-cyanophenoxy acetonitrile.

8. A compound of the formula as set forth in claim 1 which is 2-bromo-6-iodo-4-cyanophenoxy acetonitrile.

* * * * *